United States Patent

Heil

[11] Patent Number: 5,960,747
[45] Date of Patent: Oct. 5, 1999

[54] ANIMAL LEG CATCHING DEVICE

[76] Inventor: Charles C. Heil, R.R. 2, Norborne, Mo. 64668

[21] Appl. No.: 09/168,478

[22] Filed: Oct. 8, 1998

[51] Int. Cl.$^6$ .................................................. A01K 29/00
[52] U.S. Cl. ........................................... 119/801; 119/807
[58] Field of Search ..................... 119/801, 802, 119/806, 807; 294/8.5, 19.1, 19.3, 106

[56] References Cited

U.S. PATENT DOCUMENTS

| | | | |
|---|---|---|---|
| 404,583 | 6/1889 | Wickham | 119/801 |
| 718,079 | 1/1903 | Bindhammer | 294/19.3 |
| 740,715 | 10/1903 | Vanderburg | 119/807 |
| 913,619 | 2/1909 | Church | 119/807 |
| 3,125,992 | 3/1964 | King | 119/806 |
| 5,088,449 | 2/1992 | Lamb, Sr. et al. | 119/802 |
| 5,460,373 | 10/1995 | McNutt | 119/807 |

FOREIGN PATENT DOCUMENTS 135408  11/1949  Austria .................................. 119/807

*Primary Examiner*—Robert P. Swiatek
*Assistant Examiner*—Elizabeth Shaw

[57] ABSTRACT

An animal leg catching device for catching an animal by the leg in a safe manner without injury to the leg of the animal. The animal leg catching device includes a pole and first and second U-shaped members. The free end of a first arm portion of the first U-shaped member is inserted into a distal end of the pole. A first arm portion of the second U-shaped member is rotatably coupled to a second arm portion of the first U-shaped member at a point on the first arm portion of the second U-shaped member adjacent the cross portion of the second U-shaped member. The ends of a resiliently elastic strap are coupled to the first arm portion of the first U-shaped member such that the elastic strap forms a generally U-shaped loop. One end of a flexible cable is coupled to the elastic strap at the loop of the elastic strap.

10 Claims, 2 Drawing Sheets

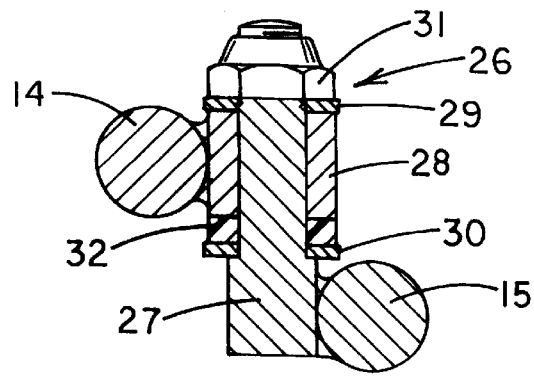
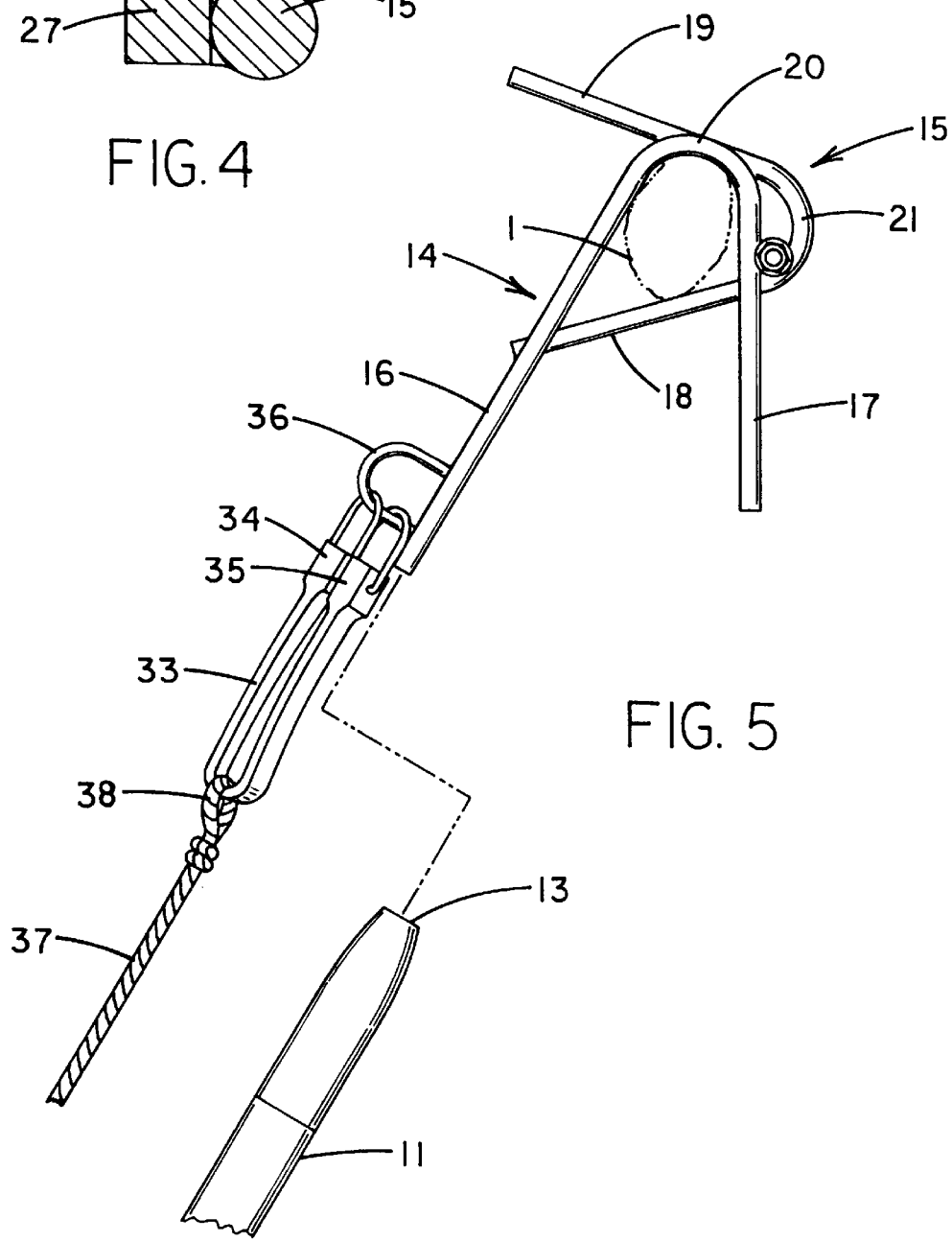

ANIMAL LEG CATCHING DEVICE

BACKGROUND OF THE INVENTION

1. Field of the Invention

The present invention relates to animal catching devices and more particularly pertains to a new animal leg catching device for catching an animal by the leg in a safe manner without injury to the leg of the animal.

2. Description of the Prior Art

The use of animal catching devices is known in the prior art. More specifically, animal catching devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,630,381; U.S. Pat. No. 2,522,533; U.S. Pat. No. 1,811,437; U.S. Pat. No. 4,250,653; U.S. Pat. No. 5,088,449; and U.S. Pat. No. 225,399.

While these devices fulfill their respective, particular objectives and requirements, the aforementioned patents do not disclose a new animal leg catching device. The inventive device includes a pole and first and second U-shaped members. The free end of a first arm portion of the first U-shaped member is inserted into a distal end of the pole. A first arm portion of the second U-shaped member is rotatably coupled to a second arm portion of the first U-shaped member at a point on the first arm portion of the second U-shaped member adjacent the cross portion of the second U-shaped member. The ends of a resiliently elastic strap are coupled to the first arm portion of the first U-shaped member such that the elastic strap forms a generally U-shaped loop. One end of a flexible cable is coupled to the elastic strap at the loop of the elastic strap.

In these respects, the animal leg catching device according to the present invention substantially departs from the conventional concepts and designs of the prior art, and in so doing provides an apparatus primarily developed for the purpose of catching an animal by the leg in a safe manner without injury to the leg of the animal.

SUMMARY OF THE INVENTION

In view of the foregoing disadvantages inherent in the known types of animal catching devices now present in the prior art, the present invention provides a new animal leg catching device construction wherein the same can be utilized for catching an animal by the leg in a safe manner without injury to the leg of the animal.

The general purpose of the present invention, which will be described subsequently in greater detail, is to provide a new animal leg catching device apparatus and method which has many of the advantages of the animal catching devices mentioned heretofore and many novel features that result in a new animal leg catching device which is not anticipated, rendered obvious, suggested, or even implied by any of the prior art animal catching devices, either alone or in any combination thereof.

To attain this, the present invention generally comprises a pole and first and second U-shaped members. The free end of a first arm portion of the first U-shaped member is inserted into a distal end of the pole. A first arm portion of the second U-shaped member is rotatably coupled to a second arm portion of the first U-shaped member at a point on the first arm portion of the second U-shaped member adjacent the cross portion of the second U-shaped member. The ends of a resiliently elastic strap are coupled to the first arm portion of the first U-shaped member such that the elastic strap forms a generally U-shaped loop. One end of a flexible cable is coupled to the elastic strap at the loop of the elastic strap.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal leg catching device apparatus and method which has many of the advantages of the animal catching devices mentioned heretofore and many novel features that result in a new animal leg catching device which is not anticipated, rendered obvious, suggested, or even implied by any of the prior art animal catching devices, either alone or in any combination thereof.

It is another object of the present invention to provide a new animal leg catching device which may be easily and efficiently manufactured and marketed.

It is a further object of the present invention to provide a new animal leg catching device which is of a durable and reliable construction.

An even further object of the present invention is to provide a new animal leg catching device which is susceptible of a low cost of manufacture with regard to both materials and labor, and which accordingly is then susceptible of low prices of sale to the consuming public, thereby making such animal leg catching device economically available to the buying public.

Still yet another object of the present invention is to provide a new animal leg catching device which provides in the apparatuses and methods of the prior art some of the advantages thereof, while simultaneously overcoming some of the disadvantages normally associated therewith.

Still another object of the present invention is to provide a new animal leg catching device for catching an animal by the leg in a safe manner without injury to the leg of the animal.

Yet another object of the present invention is to provide a new animal leg catching device which includes a pole and first and second U-shaped members. The free end of a first arm portion of the first U-shaped member is inserted into a distal end of the pole. A first arm portion of the second U-shaped member is rotatably coupled to a second arm portion of the first U-shaped member at a point on the first arm portion of the second U-shaped member adjacent the cross portion of the second U-shaped member. The ends of a resiliently elastic strap are coupled to the first arm portion of the first U-shaped member such that the elastic strap forms a generally U-shaped loop. One end of a flexible cable is coupled to the elastic strap at the loop of the elastic strap.

Still yet another object of the present invention is to provide a new animal leg catching device that may be used to catch a variety of animals having differently sized legs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic cross sectional view taken from line 4—4 of FIG. 3.

FIG. 5 is a schematic side view of the present invention with the U-shaped members in the closed position and the pole detached from the free end of the first arm portion of the first U-shaped member.

DESCRIPTION OF THE PREFERRED EMBODIMENT

Figure 1:
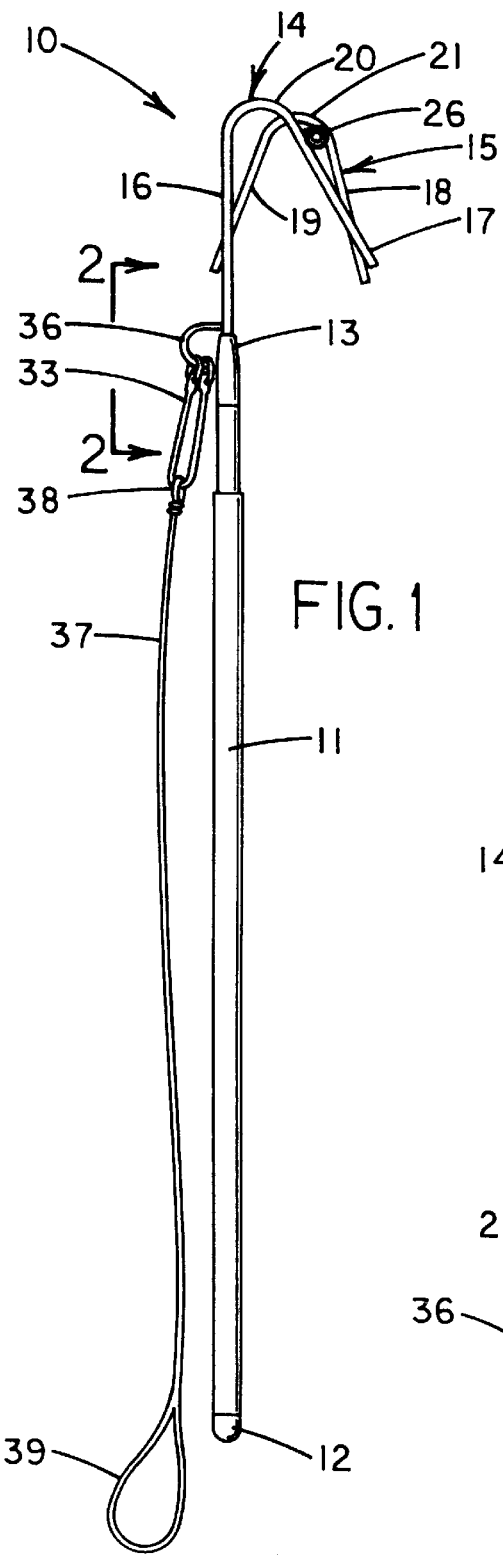
FIG. 1 is a schematic side view of a new animal leg catching device according to the present invention.

With reference now to the drawings, and in particular to FIGS. 1 through 5 thereof, a new animal leg catching device embodying the principles and concepts of the present invention and generally designated by the reference numeral 10 will be described.

As best illustrated in FIGS. 1 through 5, the animal leg catching device 10 generally comprises a pole 11 and first and second U-shaped members 14,15. The free end 22 of a first arm portion 16 of the first U-shaped member is inserted into a distal end 13 of the pole. A first arm portion 18 of the second U-shaped member is rotatably coupled to a second arm portion 17 of the first U-shaped member at a point on the first arm portion of the second U-shaped member adjacent the cross portion of the second U-shaped member. The ends 34,35 of a resiliently elastic strap 33 are coupled to the first arm portion of the first U-shaped member such that the elastic strap forms a generally U-shaped loop. One end 38 of a flexible cable 37 is coupled to the elastic strap at the loop of the elastic strap.

In closer detail, the device 10 is designed for catching the leg 1 of an animal and comprises a generally straight elongate pole 11 with opposite proximal and distal ends 12,13, and a longitudinal axis extending between the proximal and distal ends of the pole. The pole is preferably telescopically extendable along the longitudinal axis of the pole. Ideally, the pole has a generally circular transverse cross section taken substantially perpendicular to the longitudinal axis of the pole.

The first and second U-shaped members 14,15 each have a spaced apart pair of generally straight arm portions 16,17, 18,19, and an arcuate cross portion 20,21 connecting the arm portions of the respective U-shaped member together. The cross portions of each of the U-shaped members each have a concavity facing into a space between the associated arm portions of the respective U-shaped member. Each of the arm portions of the first and second U-shaped members terminating at a free end 22,23,24,25 and has a longitudinal axis extending between the respective free end and the associated cross portion. The longitudinal axes of the arm portions of each U-shaped member extend at an acute angle from one another. Preferably, the acute angle between the longitudinal axes of the arm portion of each U-shaped member is between about 45 degrees and about 90 degrees. Ideally, the acute angle between the longitudinal axes of the arm portion of each U-shaped member is about 60 degrees.

Figure 2:
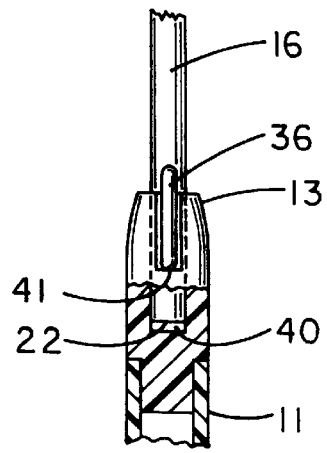
FIG. 2 is a schematic break away view of the present invention as seen from the vantage of line 2—2 of FIG. 1.

As illustrated in FIG. 2, the distal end 13 of the pole has a generally cylindrical hole 40 therein. The hole of the distal end of the pole preferably has an axis substantially coaxial with the longitudinal axis of the pole. The free end 22 of a first of the arm portions 16 of the first U-shaped member is inserted into the hole of the distal end of the pole. The free end of the first arm portion of the first U-shaped member is frictionally held in the hole of the distal end of the pole such that the first arm portion of the first U-shaped member must be pulled away from the distal end of the pole with an amount of force greater than a predetermined amount force to separate the first arm portion of the first U-shaped member from the distal end of the pole.

A first arm portion 18 of the second U-shaped member is rotatably coupled to a second arm portion 17 of the first U-shaped member at a point on the first arm portion of the second U-shaped member adjacent the cross portion of the second U-shaped member. The point of the first arm portion of the second U-shaped member is coupled to a point of the second arm of the first U-shaped member positioned towards the cross portion of the first U-shaped member. Preferably, an assembly 26 rotatably couples the second U-shaped member to the first U-shaped member. The assembly comprises a shaft 27 and a sleeve 28 disposed around the shaft to permit free rotating of the sleeve about the shaft. The first arm portion of the second U-shaped member is coupled to a first end of the shaft of the assembly and the second arm portion of the first U-shaped member is coupled to the sleeve of the assembly. The assembly has a pair of washers 29,30 disposed on the shaft of the assembly. The sleeve of the assembly is interposed between the washers on the shaft. The assembly has a nut 31 threaded on to the shaft such that the sleeve and the washers are interposed on the shaft between the nut and the first arm portion of the second U-shaped member. The assembly ideally also has a neoprene washer 32 disposed on the shaft between one of the washers and the sleeve.

Figure 3:
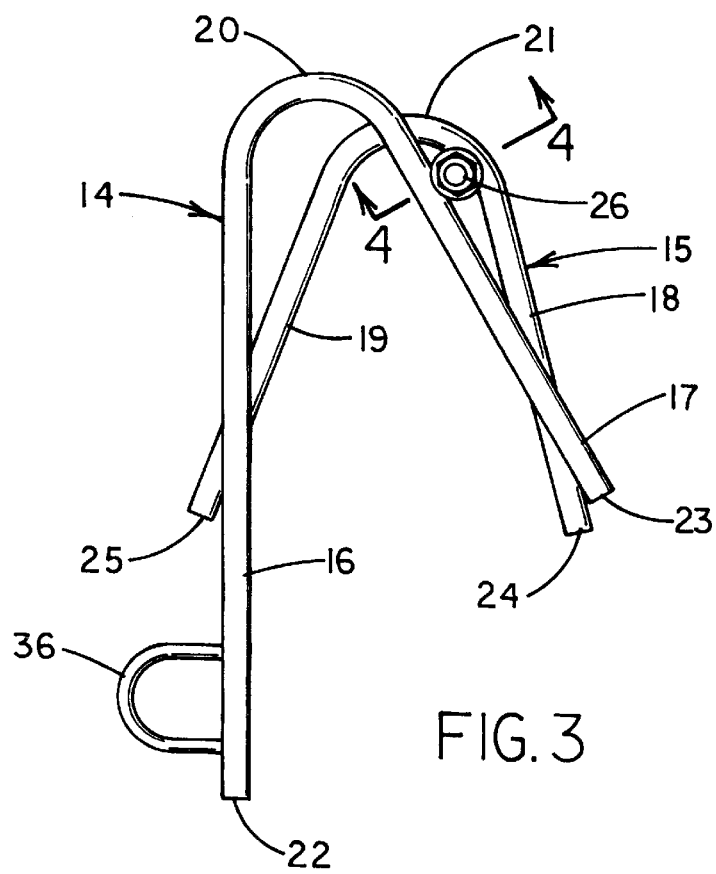
FIG. 3 is a schematic enlarged side view of the U-shaped members of the present invention detached from the pole.

The first and second U-shaped members lie in generally parallel planes to one another. In use, the second U-shaped member is rotatable with respect to the first U-shaped member about an axis extending generally perpendicular to the parallel planes of the first and second U-shaped members. In use, the second U-shaped member is rotatable between an open position and a closed position as illustrated in FIGS. 3 and 5. As illustrated in FIG. 3, the concavities of the cross portions of the U-shaped members generally face in a common direction with one another when the second U-shaped member is positioned in the open position. As illustrated in FIG. 5, the concavities of the cross portions of the U-shaped members generally face one another when the second U-shaped member is positioned in the closed position. In this position, the concavities of the cross portions of the first and second U-shaped members define a space therebetween for holding a leg of an animal therein.

An elongate resiliently elastic strap 33 has a pair of ends 34,35 coupled to the first arm portion of the first U-shaped member such that the elastic strap forms a generally U-shaped loop. Preferably, the first arm portion of the first U-shaped member has a generally U-shaped eye loop 36 outwardly extending therefrom positioned towards the free end 22 of the first arm portion of the first U-shaped member. The distal end of the pole has a longitudinal slot 41 opening into the hole of the distal end of the pole. The eye loop is outwardly extended through longitudinal slot of the distal end of the pole. The ends of the elastic strap each have ring is coupled to the eye loop to couple the ends of the elastic strap to the first arm portion of the first U-shaped member.

An elongate flexible cable 37 (such as a rope) has a pair of opposite ends 38,39. One end 38 of the flexible cable has a spring bolt hook coupled to the elastic strap at the loop of the elastic strap. The other end 39 of the flexible cable preferably has a handle loop designed for extending the hand of a user therein.

Each of the arm portions of each of the U-shaped members has a length defined between the associated free end of the respective arm portion and the associated cross portion of the respective U-shaped member. Ideally, the length of the first arm portion of the first U-shaped member is about 12 inches, the length of the second arm portion of the first U-shaped member is about 6 ½ inches, with the overall length of the first U-shaped member ideally about 21 ½ inches. In this ideal embodiment, the lengths of the first and second arm portions of the second U-shaped member are each about 6 ½ inches with the overall length of the second U-shaped member ideally about 13 inches. The first arm portion of the second U-shaped member is rotatably coupled to the second arm portion of the first U-shaped member at a point on the first arm portion of the second U-shaped member about 5 ½ inches away from the free end 24 of the first arm portion of the second U-shaped member. The point of the first arm portion of the second U-shaped member is coupled to a point of the second arm portion of the first U-shaped member about 5 inches from the free end 23 of the second arm portion of the first U-shaped member. The elastic strap ideally has a length defined between the ends of the elastic strap of about 18 inches.

In use, the user positions the U-shaped members in the open position and holds on to the handle looped end of the flexible cord and to the proximal end of the pole. The user then hooks the U-shaped member on the leg of an animal 1 so that the leg of the animal is positioned in the space between the arm portions of the U-shaped members. The use then pulls the pole to rotate the U-shaped members into the closed position so that the leg of the animal is trapped between the first and second U-shaped members. The user then pulls the pole off of the free end of the first arm portion of the first U-shaped member and holds the flexible cord tight to keep tension on the flexible cord to maintain control over the captured animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for catching the leg of an animal, comprising:
   a pole having opposite proximal and distal ends, and a longitudinal axis extending between said proximal and distal ends of said pole;
   first and second U-shaped members each having a spaced apart pair of arm portions, and a cross portion connecting said arm portions of the respective U-shaped member together;
   each of said arm portions of said first and second U-shaped members terminating at a free end and having a longitudinal axis extending between the respective free end and the associated cross portion;
   said cross portions of each of said U-shaped members having a concavity facing into a space between the associated arm portions of the respective U-shaped member;
   said free end of a first of said arm portions of said first U-shaped member being inserted into said distal end of said pole;
   a first arm portion of said second U-shaped member being rotatably coupled to a second arm portion of said first U-shaped member at a point on said first arm portion of said second U-shaped member adjacent said cross portion of said second U-shaped member;
   a resiliently elastic strap having a pair of ends coupled to said first arm portion of said first U-shaped member such that said elastic strap forms a generally U-shaped loop; and
   a flexible cable having a pair of opposite ends, one end of said flexible cable being coupled to said elastic strap at said loop of said elastic strap.

2. The device of claim 1, wherein said pole is telescopically extendable along said longitudinal axis of said pole.

3. The device of claim 1, wherein said longitudinal axes of said arm portions of each U-shaped member extend at an acute angle from one another.

4. The device of claim 3, wherein said acute angle between said longitudinal axes of said arm portion of each U-shaped member is between about 45 degrees and about 90 degrees.

5. The device of claim 3, wherein said acute angle between said longitudinal axes of said arm portion of each U-shaped member is about 60 degrees.

6. The device of claim 1, wherein said distal end of said pole has a hole therein, said free end of said first arm portion of said first U-shaped member being inserted into said hole of said distal end of said pole, said free end of said first arm portion of said first U-shaped member being frictionally held in said hole of said distal end of said pole such that said first arm portion of said first U-shaped member must be pulled away from said distal end of said pole with an amount of force greater than a predetermined amount force to separate said first arm portion of said first U-shaped member from said distal end of said pole.

7. The device of claim 6, wherein said first arm portion of said first U-shaped member has an eye loop outwardly extending therefrom positioned towards said free end of said first arm portion of said first U-shaped member, said distal end of said pole having a longitudinal slot opening into said hole of said distal end of said pole, said eye loop being outwardly extended through longitudinal slot of said distal end of said pole, said ends of said elastic strap being coupled to the eye loop to couple said ends of said elastic strap to said first arm portion of said first U-shaped member.

8. The device of claim 1, wherein an assembly rotatably couples said second U-shaped member to said first U-shaped member, said assembly comprising a shaft and a sleeve disposed around said shaft to permit free rotating of said sleeve about said shaft, said first arm portion of said second U-shaped member being coupled to a first end of said shaft of said assembly, said second arm portion of said first U-shaped member being coupled to said sleeve of said assembly.

9. The device of claim 8, wherein said assembly has a pair of washers being disposed on said shaft of said assembly, said sleeve of said assembly being interposed between said washers on said shaft, said assembly having a nut threaded on to said shaft such that said sleeve and said washers are interposed on said shaft between said nut and said first arm portion of said second U-shaped member.

10. An device for catching the leg of an animal, comprising:

an elongate pole having opposite proximal and distal ends, and a longitudinal axis extending between said proximal and distal ends of said pole, said pole being telescopically extendable along said longitudinal axis of said pole, said pole having a generally circular transverse cross section taken substantially perpendicular to said longitudinal axis of said pole;

first and second U-shaped members each having a spaced apart pair of generally straight arm portions, and an arcuate cross portion connecting said arm portions of the respective U-shaped member together;

each of said arm portions of said first and second U-shaped members terminating at a free end and having a longitudinal axis extending between the respective free end and the associated cross portion;

said cross portions of each of said U-shaped members having a concavity facing into a space between the associated arm portions of the respective U-shaped member;

said longitudinal axes of said arm portions of each U-shaped member extending at an acute angle from one another, wherein said acute angle between said longitudinal axes of said arm portion of each U-shaped member is between about 45 degrees and about 90 degrees, wherein said acute angle between said longitudinal axes of said arm portion of each U-shaped member is about 60 degrees;

said distal end of said pole having a generally cylindrical hole therein, said hole of said distal end of said pole having an axis substantially coaxial with said longitudinal axis of said pole;

said free end of a first of said arm portions of said first U-shaped member being inserted into said hole of said distal end of said pole, said free end of said first arm portion of said first U-shaped member being frictionally held in said hole of said distal end of said pole such that said first arm portion of said first U-shaped member must be pulled away from said distal end of said pole with an amount of force greater than a predetermined amount force to separate said first arm portion of said first U-shaped member from said distal end of said pole;

a first arm portion of said second U-shaped member being rotatably coupled to a second arm portion of said first U-shaped member at a point on said first arm portion of said second U-shaped member adjacent said cross portion of said second U-shaped member;

wherein an assembly rotatably couples said second U-shaped member to said first U-shaped member, said assembly comprising a shaft and a sleeve disposed around said shaft to permit free rotating of said sleeve about said shaft;

said first arm portion of said second U-shaped member being coupled to a first end of said shaft of said assembly, said second arm portion of said first U-shaped member being coupled to said sleeve of said assembly;

said assembly having a pair of washers being disposed on said shaft of said assembly, said sleeve of said assembly being interposed between said washers on said shaft, said assembly having a nut threaded on to said shaft such that said sleeve and said washers are interposed on said shaft between said nut and said first arm portion of said second U-shaped member;

said first and second U-shaped members lying in generally parallel planes to one another, said second U-shaped member being rotatable with respect to said first U-shaped member about an axis extending generally perpendicular to said parallel planes of said first and second U-shaped members;

said second U-shaped member being rotatable between an open position and a closed position;

wherein said concavities of said cross portions of said U-shaped members generally face in a common direction with one another when said second U-shaped member is positioned in said open position;

wherein said concavities of said cross portions of said U-shaped members generally face one another when said second U-shaped member is positioned in said closed position, said concavities of said cross portions of said first and second U-shaped members defining a space therebetween for holding a leg of an animal therein when said second U-shaped member is positioned in said closed position;

an elongate resiliently elastic strap having a pair of ends coupled to said first arm portion of said first U-shaped member such that said elastic strap forms a generally U-shaped loop;

said first arm portion of said first U-shaped member having a eye loop outwardly extending therefrom positioned towards said free end of said first arm portion of said first U-shaped member;

said distal end of said pole having a longitudinal slot opening into said hole of said distal end of said pole, said eye loop being outwardly extended through longitudinal slot of said distal end of said pole;

said ends of said elastic strap being coupled to the eye loop to couple said ends of said elastic strap to said first arm portion of said first U-shaped member; and an elongate flexible cable having a pair of opposite ends, one end of said flexible cable being coupled to said elastic strap at said loop of said elastic strap.

* * * * *